June 24, 1930. J. J. JANCA 1,767,135
MOTOR
Filed April 8, 1929   3 Sheets-Sheet 1

Inventor:
Joseph J. Janca,
by Rippey & Kingsland.
His Attorneys.

June 24, 1930.                J. J. JANCA                1,767,135
                                MOTOR
                      Filed April 8, 1929        3 Sheets-Sheet 3

Inventor:
Joseph J. Janca,
by Rippey & Kingsland
His Attorneys.

Patented June 24, 1930

1,767,135

UNITED STATES PATENT OFFICE

JOSEPH J. JANCA, OF ST. LOUIS, MISSOURI, ASSIGNOR TO THE EMERSON ELECTRIC MFG. CO., OF ST. LOUIS, MISSOURI, A CORPORATION OF MISSOURI

MOTOR

Application filed April 8, 1929. Serial No. 353,406.

This invention relates to improvements in electric motors, and consists in the novel construction hereinafter disclosed.

An object of the invention is to provide a motor including a rotor arranged for rotation free from load and a second rotor under the influence of the first rotor for rotating the armature shaft. The relation of the two rotors is such that the first rotor provides a rotating field producing a starting flux for the second rotor. The first rotor is arranged to be brought under the influence of main and starting coils, said rotor carrying a centrifugal switch for cutting out the starting coils after a predetermined speed of rotation has been developed.

The construction has the advantage of greatly reducing the starting current required because the first rotor rotates without load. It also has the advantage of preventing the burning out of the starting coils which results from certain starting conditions, and the further advantage of preventing the starting coils from cutting in upon a reduction of speed of the load rotor.

Additional advantages of the structure will be apparent from the following description taken in connection with the accompanying drawings in which—

Figure 1:
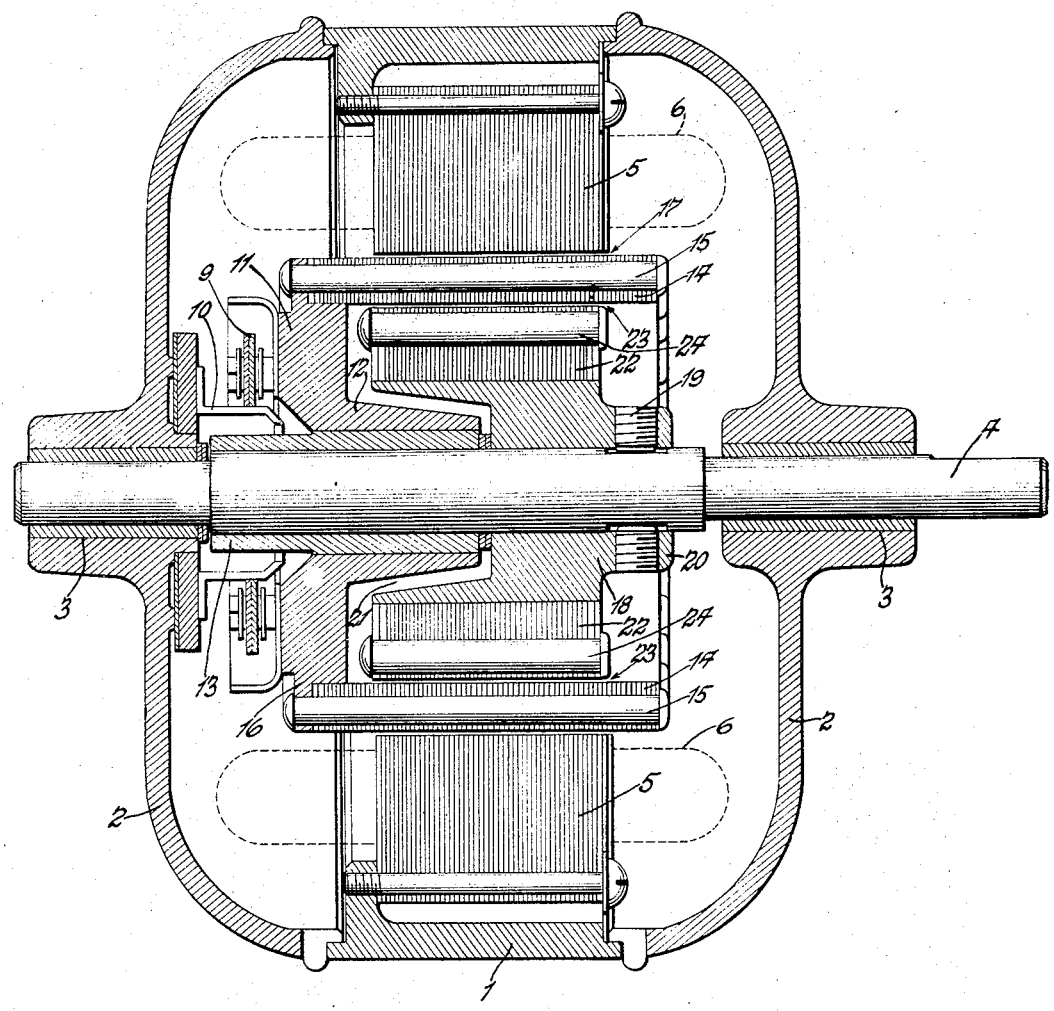
Fig. 1 is a longitudinal section through a motor embodying the invention.
Figure 2:
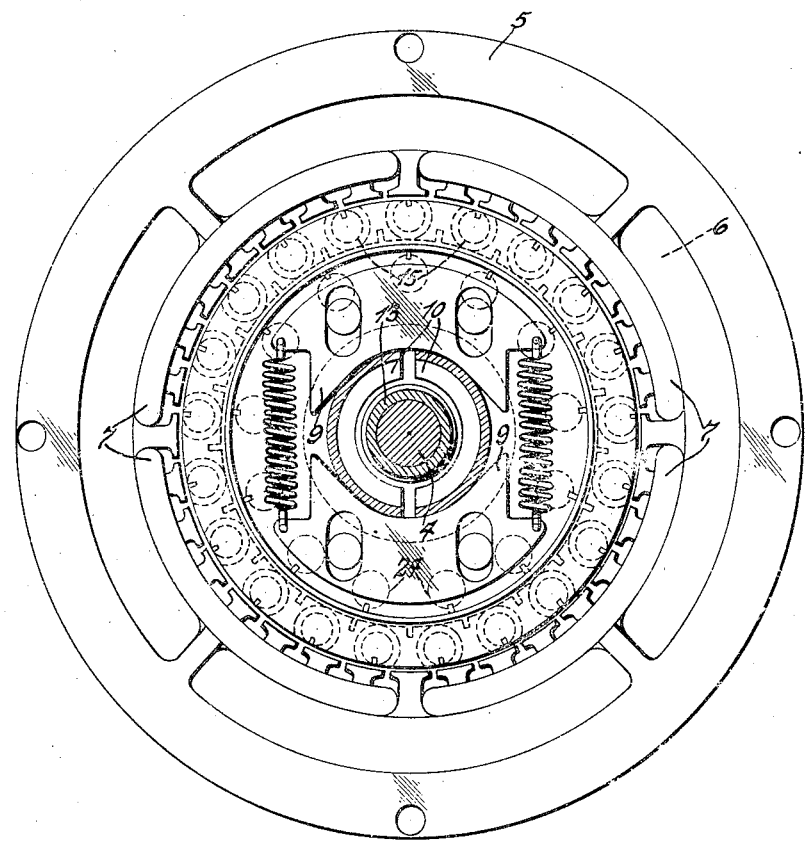
Fig. 2 is a cross section showing an end view of the motor with the end plate removed.
Figure 3:
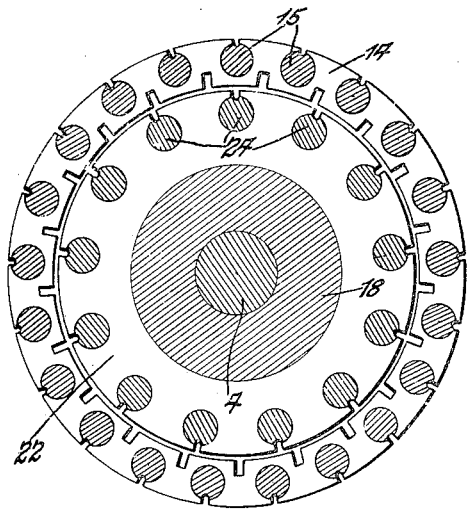
Fig. 3 is a cross section cut through the two rotors showing the relationship of the parts.
Figure 4:
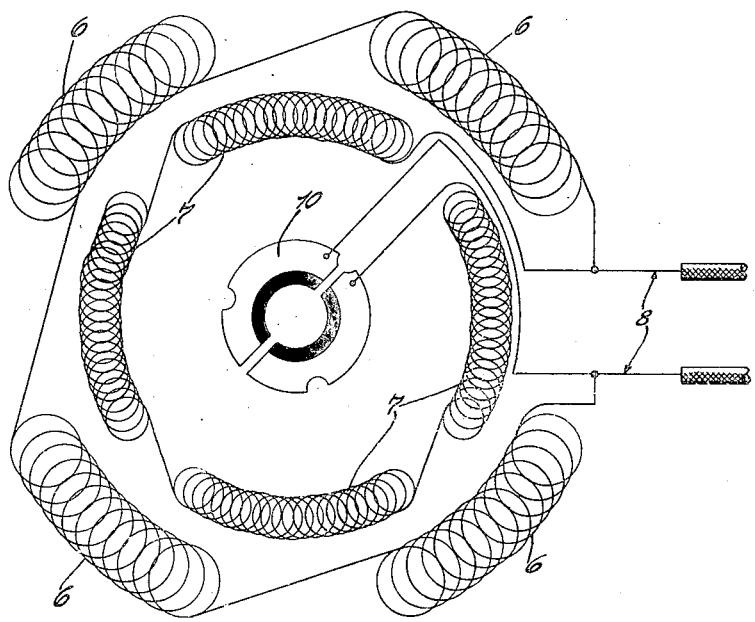
Fig. 4 is a diagram illustrating the main and starting coils and the centrifugal switch for cutting in and out the starting coils.

In the embodiment of the invention illustrated in the drawing the invention is shown as including a motor comprising a field frame 1 at the opposite sides of which are end plates 2. The end plates are each provided with an armature shaft bearing 3 in which an armature shaft 4 is journalled. The field frame carries the field structure comprising the laminated field discs 5, on which the field windings, including the main coils 6 and the starting coils 7, are wound in the usual manner. The field windings are energized from the line leads 8. It will be understood that the main and starting coils are located in respect of each other in the usual manner to produce a shifting flux which, in the present instance, rotates the free running armature, as will be more particularly described hereinafter.

An armature, which for the purpose of convenience of description will hereinafter be referred to as the starting armature, carries the rotating elements 9 of the centrifugal switch or cut-out, the stationary member 10 of which is mounted on and supported by one of the end plates 2. The centrifugal switch is of known construction and operates in the well known manner to cut out the starting coils after the starting armature has attained a predetermined speed.

The starting armature proper comprises an armature core 11 having an extension 12 that is mounted on a journal member 13. The journal member 13 is mounted for free rotation on the armature shaft 4. The armature, in the embodiment shown, is of the squirrel cage type comprising a series of laminations 14 having a series of conductors 15 extending laterally therethrough, the ends of the conductors being riveted to a web 16 on the armature core 11 at one end and to the face of the laminations at the opposite end. It will be noted by reference to Fig. 1 of the drawing that the core 11 is formed to support the cylindrical series of laminations at one end. The laminations extend laterally and form a cylindrical armature. The outer periphery of the laminations lie within and adjacent to the bore of the field structure, thus providing an air gap 17 between the bore of the field structure and the outer periphery of the starting armature.

An internal armature, which for convenience of description will be referred to as the load armature, comprises a core 18 mounted on the armature shaft 4 to which it is fastened by screw 19 passing through a hub 20 of the armature core 18. The screws seat against flattened faces on the armature shaft. The inner end of the load armature core 18 is recessed to form a cavity 21 to accommodate the inner extension 12 of the armature coil 11 and the inner extremity of the bearing member 13. The armature core 18 carries laminations 22 which extend across the periphery of the core. The outer periphery of the laminations 22 is spaced from the inner periphery of the laminations of the starting armature. Thus an air gap 23 is provided between the starting armature and the load armature. A series of conductors 24 pass laterally through the laminations 22 and are riveted at their opposite ends against the outer faces thereof.

The operation of the motor is as follows:

Assuming that the starting and load armatures are at rest, the exciting current is applied to the main and starting windings, thereby producing a shifting flux, which acts upon the starting armature causing it to rotate on the bearing 13. The centrifugal switch is closed until the rotor attains a predetermined speed, thereby simultaneously exciting both the main and starting coils. Upon the rotation of the starting armature a rotating field is developed, thereby producing a starting flux for the load armature. When the starting armature has attained a predetermined speed the centrifugal switch is opened and the starting coils cut out. The rotation of the starting armature continues to develop the rotating field, causing the load armature to rotate in the same direction and thereby to be brought up to the normal speed of the motor. If the speed of rotation of the load armature is reduced, due to the load condition, there is no influence on the centrifugal switch because the starting armature, being free from load, continues to rotate at a sufficient speed to hold the centrifugal switch in a cut out position.

It is apparent therefore that the advantages of the invention are fully accomplished, and that the amount of starting current required is reduced. By avoiding undue load on the starting coils there is little danger of them burning out. It is further apparent that, during the operation of the motor, there is no cutting in of the starting coils, thus avoiding an undue consumption of current and avoiding a condition that likely would result in burning out the coils during the operation of the motor.

While the invention has been described in connection with a single phase squirrel cage type of motor, it is obvious that the principles of the invention may be applicable to other types of motors. I do not limit myself to the exact construction shown and described, but what I claim and desire to secure by Letters Patent is:—

1. A motor comprising the combination of a field structure including starting and main coils, with a starting armature, a centrifugal switch actuated by the starting armature for cutting in and out the starting coils, and a load armature within the influence of a field caused to rotate by the starting armature.

2. In a motor, the combination of a motor shaft and a load armature for rotating said shaft, with a stationary field structure including main and starting coils, a starting armature located intermediate the field structure and the load armature adapted to influence the flux passing from the stationary field to the load armature and effecting a flux phase rotation, and a centrifugal switch adapted to operate upon a predetermined speed developed by the starting armature for cutting out the starting coils.

3. In a motor, the combination of an armature, with a stationary field structure having starting and main windings, means for producing a revolving field for influencing the rotation of the armature, and a device under the influence of said means for cutting in and out the starting windings aforesaid.

4. In a motor, the combination of a stationary field member having main and starting coils, with an armature shaft, an armature carried by said shaft, a starting armature located intermediate the field member and said first named armature, and a device actuated by said starting armature for controlling the starting windings of the stationary field.

5. In a motor, the combination with a housing, of an armature shaft journalled in the housing, an armature core carried by said shaft, an armature carried by said core, a support mounted upon and independently revoluble in respect of said armature shaft, a cylindrical armature structure supported by said member and extending across and around said first named armature, a stationary field member circumscribing said last named armature and having main and starting coils, and a device controlled by said second named armature for controlling the passage of current to the starting coils.

JOSEPH J. JANCA.